Dec. 22, 1964

W. E. JOOR II 3,162,701

BUBBLE TRAY

Filed June 7, 1961

INVENTOR.
William E. Joor, II
BY
Bertram H. Mann
ATTORNEY

Dec. 22, 1964  W. E. JOOR II  3,162,701
BUBBLE TRAY
Filed June 7, 1961  2 Sheets-Sheet 2
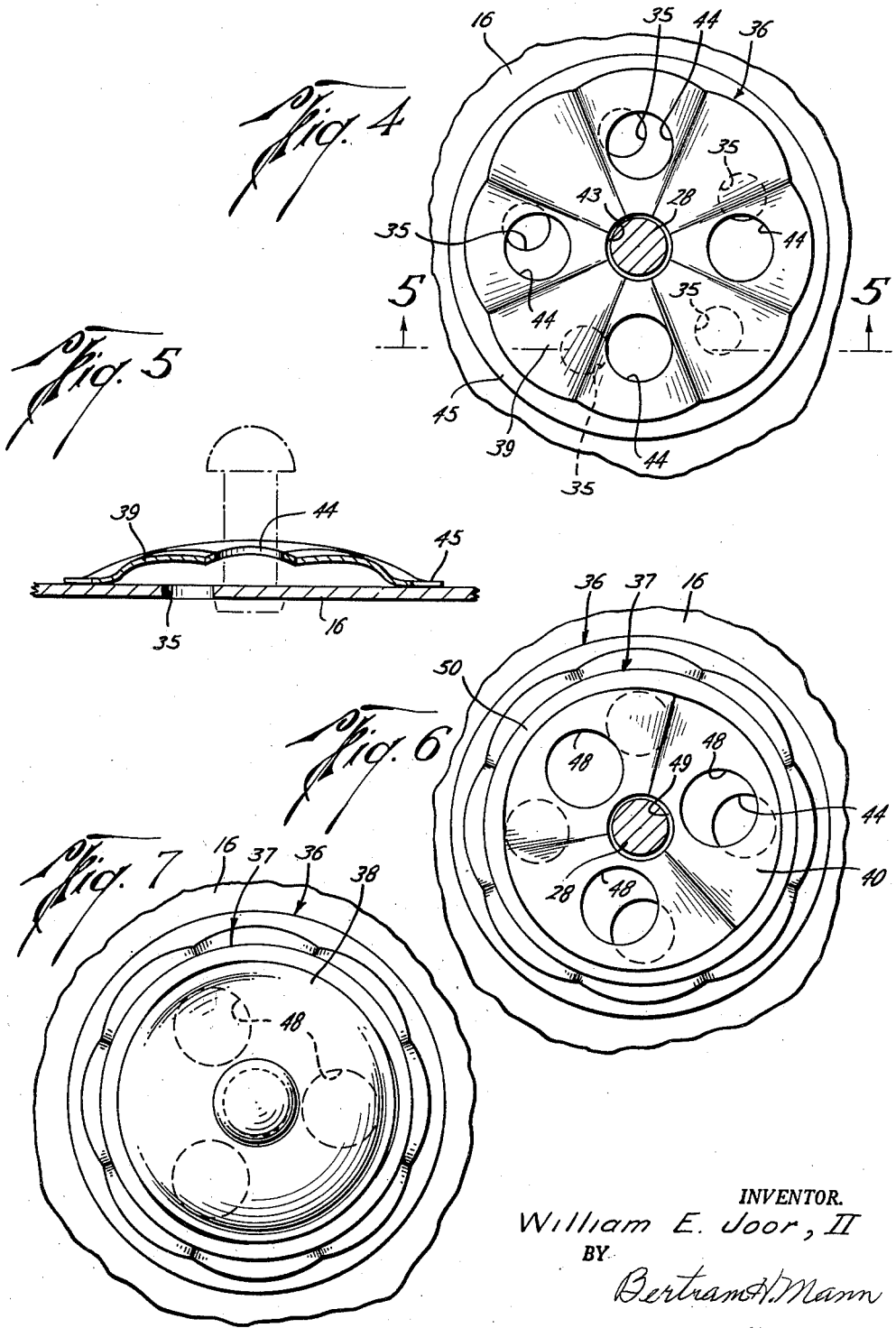
INVENTOR.
William E. Joor, II
BY
Bertram H. Mann
ATTORNEY

United States Patent Office 3,162,701
Patented Dec. 22, 1964

3,162,701
BUBBLE TRAY
William E. Joor II, Houston, Tex., assignor to Wyatt Industries, Inc., Houston, Tex., a corporation of Texas
Filed June 7, 1961, Ser. No. 115,577
1 Claim. (Cl. 261—114)

This invention relates to gas and liquid contact apparatus of the type used in fractionation, absorption, rectifying, washing, and like operations, particularly in the petroleum, petro-chemical and chemical industries.

Bubble towers used in such operations usually are provided with vertically stacked trays in a pressure vessel having means for passing liquid across the trays and downwardly from tray to tray while vapors or gases pass upwardly through suitable openings in the trays. Maximum intimacy of contact between the countercurrent liquid and gaseous streams is desirable to cause the most effective separation of low boiling components from the high boiling components which compose the feed stock to the fractionation tower. This results in improved efficiency of the gas liquid contacting device and permits reduction in the application of energy in heating the residue liquid at the bottom of the column and cooling of the gases at the top of the column. Improved efficiency also permits reduction in the overall size of the tower and the number of trays.

Previous apparatus of this type having trays with fixed orifices or so-called bubble caps, or weighted or spring-pressed valve controlled orifices, have not achieved maximum efficiency of contact. The fixed orifice devices, for instance, if too small restrict the volume of flow or, if too large, reduce the pressure differential across the individual plates so that uniform distribution of the contacting streams is lost. Ordinary check valve devices are deficient in that a greater initial pressure differential is required to unseat the valves than to hold them open. Thus a smoothly progressive increase in the effective flow path through the tray, as the pressure differential increases, is not achieved.

Accordingly, an object of the present invention is to provide an improved gas and liquid contact apparatus in which maximum efficiency is achieved without loss of flexibility or capacity.

Another object is to provide a bubble tray having upward flow orifices controlled by check valve means arranged in such a way as to provide a minimum upward flow path through the tray under relatively low pressure differential conditions, with progressively increasing flow paths as the volume of gas and, therefore, the pressure differential increases.

Still another object is to provide a bubble tray with orifices controlled by check valves with novel, inexpensive guiding and stop means.

These objects and other more detailed objects hereafter appearing are obtained substantially by the structure and apparatus illustrated in the accompanying drawings, in which FIG. 1 is a vertical transverse center sectional view through a portion of a bubble tower embodying the invention.

FIG. 4 is a generally horizontal section taken on line 4—4 of FIG. 3.

FIG. 5 is a vertical transverse section taken on line 5—5 of FIG. 4.

FIG. 6 is a view similar to FIG. 4 but taken on line 6—6 of FIG. 3.

FIG. 7 is a top view of the structure in FIG. 3.

In general, the herein-disclosed improvement consists of a bubble tray for supporting a body of down-flowing liquid and having orifices arranged in any suitable manner for admitting upwardly flowing gases therethrough. Each orifice is controlled by one or more check valve members which normally rest upon the tray in such position as to restrict the orifice or orifices controlled thereby. The single or plural valve discs are radially fluted and/or suitably recessed or apertured so as, in the rest positions, to at least partially restrict the tray orifices which they control and are shiftable upwardly by predominant pressure on their under surfaces to reduce their restrictive effect on the tray orifices and, thereby, increase the effective flow path through the tray portion.

Figure 1:
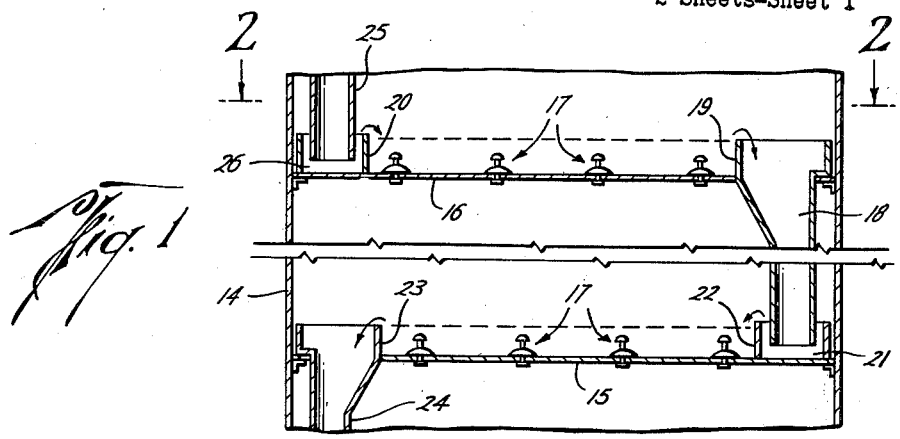
Figure 2:
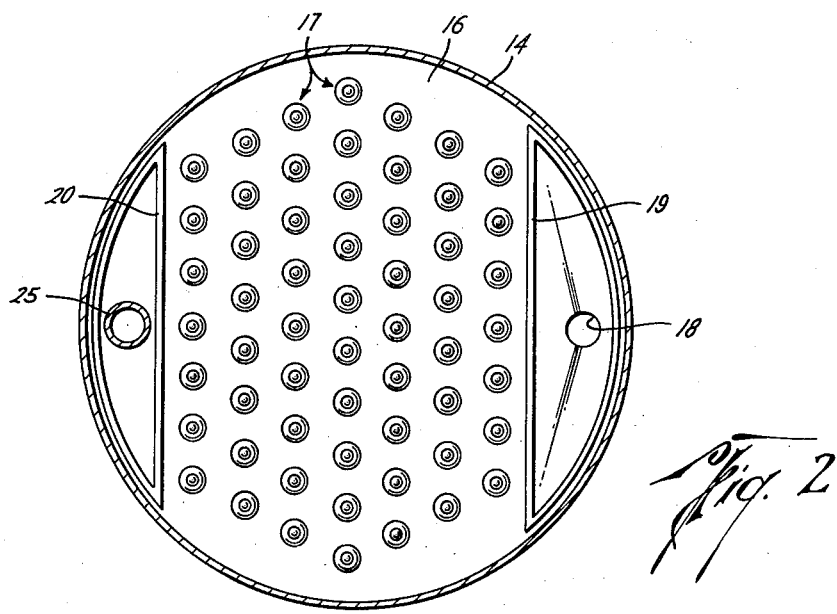
FIG. 2 is a top view of the structure in FIG. 1.

FIGS. 1 and 2 illustrate portions of a bubble tower embodying the invention, including the shell 14 of the pressure vessel enclosing a vertical series of horizontal trays 15 and 16. Each tray has a plurality of more or less evenly distributed holes therein, some or all of which are controlled by valve arrangements, generally designated 17. At the right side of tray 16 there is provided a downcomer duct 18 forming a weir 19 at its upper portion. Weir 19 serves to keep the liquid flowing across the tray at a depth greater than the height of weir 19, so that the vapors may be intimately mixed with the liquid. Across the tray 16 from weir 19 is a second weir 20 which is placed to restrict the flow of liquid through the downcomer pipe 25 from the tray above. This weir 20 serves to distribute the flow of liquid evenly before it flows across tray 16 and to prevent gaseous bubbles or froth from flowing into the lower end of the downcomer 25 and disrupting the downward flow of liquid in the downcomer. Downcomer 18 leads into the space 21 formed by weir 22 at the right-hand side of lower tray 15, while a weir 23 and downcomer 24 lead from the left-hand side of tray 15. Weir 22 serves the same function as weir 20. The arrangement is such, as is customary in bubble towers of this type, that liquid flows downwardly through downcomer 25, thence overflows weirs 20 and 19 into downcomer 18, thence overflows weirs 22 and 23 into downcomer 24, and so on, until the liquid residue is collected at or drawn off from the bottom of the vessel. Gaseous materials rise through the orifices controlled by valves 17 and through all the trays successively into the upper part of the vessel for further processing or drawing off.

Figure 3:
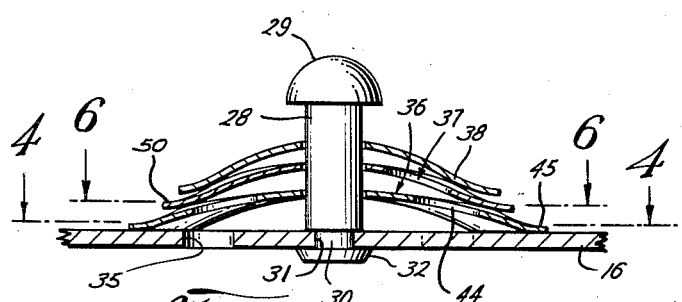
FIG. 3 is an enlarged vertical transverse section through one of the check valve controlled tray portions.

The valve devices are shown enlarged and in detail in FIGS. 3-7, inclusive. At the center of each valve device there is provided a vertical stem 28 of rivet form having a head 29 and a reduced lower extremity 30 extending through a close fitting aperture 31 in the tray and riveted over, as at 32, for attachment to the tray. Surrounding the stem 28 are five orifices 35 of equal size and equally spaced about the stem. The number and positioning of orifices may be varied. Slidably received on the stem are three disc-like valves, generally designated 36, 37 and 38. The valves are upwardly bowed and of increasing curvature as illustrated in FIG. 3, and lower valves 36 and 37 are provided, respectively, with eight and three radial flutes designated 39 and 40.

Lowermost valve disc 36 (FIGS. 4 and 5) has a central aperture 43 loosely received upon stem 28 and has four orifices 44 equally spaced radially and circumferentially about the stem and located in alternate radial flutes 39. A flat flange 45, normal to the axis of the disc, extends around the periphery thereof and normally rests on the tray. The orifices 44 preferably are larger than tray orifices 35 and positioned and sized, together with radial flutes 39, so that when disc valve 36 is at rest on the tray, the flow path upwardly through the corresponding tray orifices 35 will be substantially restricted.

Intermediate valve disc 37 (FIG. 6) is of less diameter than bottom disc 36 and has three orifices 48 somewhat larger than orifices 44 and centered and equally spaced about its central aperture 49 loosely received on stem 28. Orifices 48 and flutes 40 are sized and positioned with respect to corresponding tray orifices 35 and lower valve orifices 44 to further restrict the upward flow path through the tray, when the intermediate valve is at rest with its peripheral flange 50 on the crests of the flutes in the lower valve.

The uppermost bowed valve disc 38 is of less diameter than the intermediate valve and has a central aperture also loosely received upon stem 28. This valve disc is not fluted, as are the lowermost discs and is imperforate.

In order to assemble the valve device with a tray, the reduced lower extremity 30 of the stem 28, with the three valve discs assembled thereon, is inserted through one of the tray apertures 31 and secured to the tray by riveting, as shown at 32 in FIG. 3. Alternate stem attaching means may be used.

In operation of the multi-stage valve arrangement shown in FIGS. 3–7, when the pressure differential across the tray is less than a predetermined minimum, all three disc valves will be in their rest positions in which gaseous materials rising in the column may take the restricted paths through tray orifices 35 and thence through orifices 44 in the lower disc valve and 48 in the intermediate valve and out into the space above the trays through the valleys between the flutes 39 and 40 in valves 36 and 37. Upon a slight increase in gas pressure, uppermost disc valve 38 will be lifted so as to decrease the restriction or increase the effective flow path through the mentioned orifices and valleys. Further increase of pressure differential will cause intermediate valve disc 37 to lift and, ultimately, lower valve disc 36 also will lift to progressively increase the effective flow path through the tray. Thus, the valve arrangements will permit a minimum gaseous flow across the tray, even at relatively low gas pressures on the under sides of the plates and valve discs, and at each stage will jet the gas flow radially into the body of liquid on the tray at different levels so as to produce maximum gas and liquid contact and, therefore, maximum efficiency of the tray.

The novel multi-stage bubble valve devices shown achieve substantially greater efficiency and flexibility than previous devices for the purpose. These advantages are attained by the smooth progressive operation of the valve discs, while the construction is notably inexpensive. The valve discs may be varied in their fluting or recessing as well as in the sizing and positioning of their orifices and the number of discs used may be varied. The invention may be varied as will occur to those skilled in the art, and the exclusive use of all modifications as come within the scope of the appended claim is contemplated.

I claim:

Gas and liquid contact apparatus comprising a tray for supporting a body of liquid and having an orificed portion, at least three inverted dish-shaped disks stacked on said portion and with axially aligned apertures therethrough, a guide stem rigid with and projecting upwardly from said tray through said apertures and slidably receiving said disks, and valve stop means on said stem spaced above the uppermost of said disks in its rest position, said disks being of decreasing diameters and increasing curvatures in ascending order with the lowermost of said disks having a peripheral flange for resting on said tray, the lower ones of said disks being radially fluted so as to form restricted lateral ducts between adjacent disks and having orifices whereby gases may ascend through said tray portion and said orifices and pass laterally between said disks into the liquid on said tray, the uppermost of said disks being imperforate for confining ascending gases to said ducts, said disks being progressively liftable in descending order, as the pressure differential across said tray increases, for increasing the effective sizes of said lateral ducts.

References Cited in the file of this patent

UNITED STATES PATENTS

| | | |
|---|---|---|
| 1,453,735 | Twining | May 1, 1923 |
| 1,878,467 | Clarke | Sept. 20, 1932 |
| 2,428,889 | Nutter | Oct. 14, 1947 |
| 2,658,737 | Nutter | Nov. 10, 1953 |
| 2,784,953 | Ng | Mar. 12, 1957 |
| 2,903,251 | Thrift | Sept. 8, 1959 |
| 2,979,316 | Houston | Apr. 11, 1961 |

FOREIGN PATENTS

| | | |
|---|---|---|
| 1,233,551 | France | May 9, 1960 |
| | (Corresponding U.S. 3,013,782, Dec. 19, 1961) | |
| 1,237,299 | France | June 20, 1960 |